United States Patent
Oh et al.

(10) Patent No.: US 12,148,886 B2
(45) Date of Patent: Nov. 19, 2024

(54) NON-AQUEOUS ELECTROLYTE FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Jeong Woo Oh, Daejeon (KR); Chul Haeng Lee, Daejeon (KR); Hyung Tae Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 542 days.

(21) Appl. No.: 17/601,820

(22) PCT Filed: Apr. 24, 2020

(86) PCT No.: PCT/KR2020/005473
§ 371 (c)(1),
(2) Date: Oct. 6, 2021

(87) PCT Pub. No.: WO2020/222469
PCT Pub. Date: Nov. 5, 2020

(65) Prior Publication Data
US 2022/0181691 A1  Jun. 9, 2022

(30) Foreign Application Priority Data
Apr. 30, 2019 (KR) .................. 10-2019-0050870

(51) Int. Cl.
*H01M 4/38* (2006.01)
*H01M 4/13* (2010.01)
(Continued)

(52) U.S. Cl.
CPC ....... *H01M 10/0567* (2013.01); *H01M 4/133* (2013.01); *H01M 4/364* (2013.01);
(Continued)

(58) Field of Classification Search
CPC ......... H01M 10/0567; H01M 10/0568; H01M 10/0569; H01M 4/386; H01M 4/505; H01M 4/525
See application file for complete search history.

(56) References Cited

U.S. PATENT DOCUMENTS

2009/0053599 A1  2/2009  Ichihashi et al.
2011/0052999 A1  3/2011  Lee et al.
(Continued)

FOREIGN PATENT DOCUMENTS

CN    101630759 A    1/2010
JP    2000156245 A   6/2000
(Continued)

OTHER PUBLICATIONS

Machine Translation of: JP 2012-104439 A, Watabe et al., May 31, 2012.*

(Continued)

*Primary Examiner* — Kenneth J Douyette
(74) *Attorney, Agent, or Firm* — Lerner David LLP

(57) ABSTRACT

A non-aqueous electrolyte for a lithium secondary battery and a lithium secondary battery including the same are disclosed herein. In some embodiments, a non-aqueous electrolyte for a lithium secondary battery includes an organic solvent, a lithium salt, and a compound represented by Formula 1. In some embodiments, the compound represented by Formula 1 is present in an amount of 0.1 part by weight to 3 parts by weight based on 100 parts by weight of the non-aqueous electrolyte.

9 Claims, 1 Drawing Sheet

(51) Int. Cl.
| | |
|---|---|
| *H01M 4/133* | (2010.01) |
| *H01M 4/36* | (2006.01) |
| *H01M 4/50* | (2010.01) |
| *H01M 4/505* | (2010.01) |
| *H01M 4/52* | (2010.01) |
| *H01M 4/525* | (2010.01) |
| *H01M 4/58* | (2010.01) |
| *H01M 4/587* | (2010.01) |
| *H01M 10/0525* | (2010.01) |
| *H01M 10/0567* | (2010.01) |
| *H01M 4/02* | (2006.01) |

(52) U.S. Cl.
CPC ........... *H01M 4/386* (2013.01); *H01M 4/505* (2013.01); *H01M 4/525* (2013.01); *H01M 4/587* (2013.01); *H01M 10/0525* (2013.01); *H01M 2004/027* (2013.01); *H01M 2004/028* (2013.01); *H01M 2300/0025* (2013.01)

(56) References Cited

U.S. PATENT DOCUMENTS

| | | |
|---|---|---|
| 2012/0021300 A1 | 1/2012 | Abe et al. |
| 2015/0104720 A1 | 4/2015 | Ma et al. |
| 2016/0152573 A1 | 6/2016 | Unciti-Broceta et al. |
| 2016/0293944 A1* | 10/2016 | Yoon ..................... H01M 4/483 |
| 2017/0062822 A1 | 3/2017 | Hwang |
| 2018/0362473 A1 | 12/2018 | Unciti-Broceta et al. |
| 2019/0356021 A1 | 11/2019 | Lim et al. |
| 2020/0044287 A1 | 2/2020 | Kim et al. |

FOREIGN PATENT DOCUMENTS

| | | |
|---|---|---|
| JP | 2007141495 A | 6/2007 |
| JP | 2008123732 A | 5/2008 |
| JP | 2011222450 A | 11/2011 |
| JP | 2012104439 A | 5/2012 |
| JP | 2014194930 A | 10/2014 |
| JP | 2014209479 A | 11/2014 |
| JP | 2018063942 A | 4/2018 |
| KR | 20090079571 A | 7/2009 |
| KR | 101318522 B1 | 10/2013 |
| KR | 20150042373 A | 4/2015 |
| KR | 20170025136 A | 3/2017 |
| KR | 20180106971 A | 10/2018 |
| KR | 20190008100 A | 1/2019 |
| WO | 2006088002 A1 | 8/2006 |

OTHER PUBLICATIONS

Millipore Sigma product data "5-Fluoro-1-propargyl-uracil", retrieved online on Mar. 18, 2024 from: https://www.sigmaaldrich.com/US/en/product/sigma/sml1162.*

Search report from International Application No. PCT/KR2020/005473, mailed Jul. 31, 2020.

Extended European Search Report for Application No. 20798807.2 dated Apr. 4, 2022, pp. 1-5.

* cited by examiner

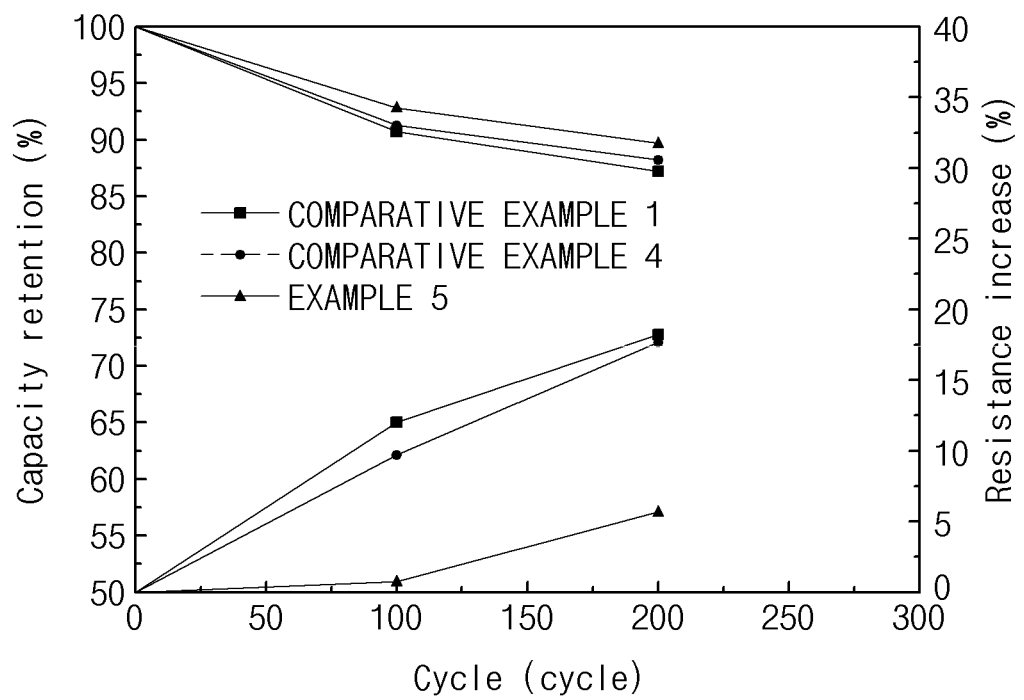

NON-AQUEOUS ELECTROLYTE FOR LITHIUM SECONDARY BATTERY AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2020/005473, filed on Apr. 24, 2020, which claims priority from Korean Patent Application No. 10-2019-0050870, filed on Apr. 30, 2019, the disclosures of which are incorporated by reference herein.

TECHNICAL FIELD

The present invention relates to a non-aqueous electrolyte for a lithium secondary battery and a lithium secondary battery including the same, and more particularly, to a non-aqueous electrolyte for a lithium secondary battery, which includes an electrolyte additive capable of suppressing an increase in resistance during a high-temperature exposure by minimizing a film-destroying reaction in intercalation and deintercalation processes of lithium (Li) ions during charge/discharge through the formation of a stable solid electrolyte interphase (SEI) on an electrode interface, and a lithium secondary battery including the same.

BACKGROUND ART

Recently, interests in energy storage technologies have been increasingly grown, and efforts for research and development of electrochemical devices have been gradually materialized as the application of the energy storage technologies is expanded to the energy of mobile phones, camcorders, notebook PCs, and even to electric vehicles.

There emerges an interest in the development of rechargeable secondary batteries among these electrochemical devices, and, particularly, lithium secondary batteries developed in the early 1990's are spotlighted because the lithium secondary batteries are advantageous in that they have higher operating voltage and significantly higher energy density.

A lithium secondary battery is generally prepared by a method as follows. An electrode assembly is formed by disposing a separator between a positive electrode including a positive electrode active material formed of a transition metal oxide containing lithium and a negative electrode including a negative electrode active material capable of storing lithium ions, and, after the electrode assembly is inserted into a battery case, injecting a non-aqueous electrolyte that becomes a medium for delivering lithium ions and then sealing the battery case.

The non-aqueous electrolyte is generally composed of a lithium salt and an organic solvent capable of dissolving the lithium salt, wherein $LiPF_6$ or the like is mainly used as the lithium salt. However, with respect to a $PF_6^-$ anion, since it is very vulnerable to heat, it thermally decomposes to generate a Lewis acid, such as $PF_5$, when the battery is exposed to high temperatures. The Lewis acid, such as $PF_5$, not only causes decomposition of the organic solvent such as ethyl carbonate, but also destroys a solid electrolyte interphase (SEI), which is formed by a reduction reaction on a surface of the active material having an operating voltage outside an electrochemical stability window of an electrolyte solution, to increase resistance of the battery and degrade life characteristics.

Thus, there is a need to develop a lithium secondary battery which may prevent the resistance increase and performance degradation of the battery by preventing the damage of the SEI at high temperatures.

DISCLOSURE OF THE INVENTION

Technical Problem

An aspect of the present invention provides a non-aqueous electrolyte for a lithium secondary battery, which includes an additive having a functional group capable of strengthening a solid electrolyte interphase (SEI) on a surface of a positive electrode and/or a negative electrode and scavenging an electrolyte by-product that causes decomposition of the SEI, and a lithium secondary battery including the same.

Technical Solution

According to an aspect of the present invention, there is provided a non-aqueous electrolyte for a lithium secondary battery which includes an organic solvent; a lithium salt; and a compound represented by Formula 1.

[Formula 1]

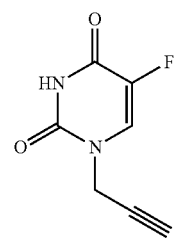

According to another aspect of the present invention, there is provided a lithium secondary battery including a positive electrode; a negative electrode; a separator disposed between the positive electrode and the negative electrode; and the non-aqueous electrolyte according to the present invention.

Advantageous Effects

An additive of Formula 1 included in a non-aqueous electrolyte of the present invention is a compound containing nitrogen (N), fluorine (F), and a propargyl group, wherein, since an N atom in the compound acts as a Lewis base to scavenge a Lewis acid generated as an electrolyte decomposition product, it may suppress additional decomposition of an organic solvent in the electrolyte.

Since the propargyl group included in the additive of Formula 1 induces polymerization of a solid electrolyte interphase (SEI) by being decomposed on a surface of an electrode, it may allow a passivation layer on the surface of the electrode to be densely formed, and thus, it increases stability of the SEI.

Also, since a F atom included in the additive of Formula 1 is separated from the compound to form LiF as a component of a negative electrode SEI, it allows the negative electrode SEI to be stably formed.

Thus, if the non-aqueous electrolyte of the present invention including the additive of Formula 1 is used, since a damage of the SEI during a high-temperature exposure and gas generation caused by a decomposition reaction of the electrolyte are suppressed, degradation of battery performance at high temperatures may be effectively prevented.

BRIEF DESCRIPTION OF THE DRAWINGS

The FIGURE is a graph illustrating the results of the measurement of high-temperature cycle characteristics according to Experimental Example 3.

MODE FOR CARRYING OUT THE INVENTION

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

As a result of significant amount of research conducted to develop a lithium secondary battery having excellent performance even at high temperatures, the present inventors have found that a damage of a solid electrolyte interphase (SEI) at high temperatures may be effectively suppressed by using a specific compound containing nitrogen (N), fluorine (F), and a propargyl group as a non-aqueous electrolyte additive, thereby leading to the completion of the present invention.

Hereinafter, the present invention will be described in more detail.

Non-Aqueous Electrolyte

A non-aqueous electrolyte according to the present invention includes a lithium salt, an organic solvent, and a compound represented by the following Formula 1.

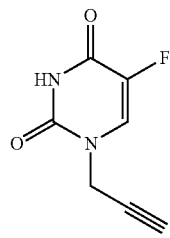

[Formula 1]

(1) Lithium Salt

Various lithium salts typically used in an electrolyte for a lithium secondary battery may be used as the lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $SCN^-$, and $(CF_3CF_2SO_2)_2N^-$ as an anion.

Specifically, the lithium salt may include at least one selected from the group consisting of LiCl, LiBr, LiI, $LiBF_4$, $LiClO_4$, $LiAlO_4$, $LiAlCl_4$, $LiPF_6$, $LiSbF_6$, $LiAsF_6$, $LiB_{10}Cl_{10}$, LiBOB ($LiB(C_2O_4)_2$), $LiCF_3SO_3$, LiTFSI ($LiN(SO_2CF_3)_2$), LiFSI ($LiN(SO_2F)_2$), $LiCH_3SO_3$, $LiCF_3CO_2$, $LiCH_3CO_2$, and LiBETI ($LiN(SO_2CF_2CF_3)_2$). Specifically, the lithium salt may include a single material selected from the group consisting of $LiBF_4$, $LiClO_4$, $LiPF_6$, LiBOB ($LiB(C_2O_4)_2$), $LiCF_3SO_3$, LiTFSI ($LiN(SO_2CF_3)_2$), LiFSI ($LiN(SO_2F)_2$), and LiBETI ($LiN(SO_2CF_2CF_3)_2$), or a mixture of two or more thereof.

The lithium salt may be appropriately changed in a normally usable range, but may be included in a concentration of 0.8 M to 4.0 M, specifically, 1.0 M to 3.0 M in an electrolyte solution to obtain an optimum effect of forming a film for preventing corrosion of a surface of an electrode.

If the concentration of the lithium salt is less than 0.8 M, an effect of improving low-temperature output and cycle characteristics during high-temperature storage of a lithium secondary battery is insignificant, and, if the concentration of the lithium salt is greater than 4.0 M, impregnability of the electrolyte solution may be reduced due to an increase in viscosity of the non-aqueous electrolyte solution.

(2) Organic Solvent

Various organic solvents typically used in a lithium electrolyte may be used as the organic solvent without limitation. For example, the organic solvent may include a cyclic carbonate-based organic solvent, a linear carbonate-based organic solvent, or a mixed organic solvent thereof.

The cyclic carbonate-based organic solvent is an organic solvent which may well dissociate the lithium salt in the electrolyte due to high permittivity as a highly viscous organic solvent, wherein specific examples of the cyclic carbonate-based organic solvent may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate-based organic solvent may include ethylene carbonate.

Also, the linear carbonate-based organic solvent is an organic solvent having low viscosity and low permittivity, wherein typical examples of the linear carbonate-based organic solvent may be at least one organic solvent selected from the group consisting of dimethyl carbonate (DMC), diethyl carbonate (DEC), dipropyl carbonate, ethyl methyl carbonate (EMC), methylpropyl carbonate, and ethylpropyl carbonate, and the linear carbonate-based organic solvent may specifically include ethyl methyl carbonate (EMC).

Furthermore, the organic solvent may further include a linear ester-based organic solvent and/or a cyclic ester-based organic solvent in the cyclic carbonate-based organic solvent and/or the linear carbonate-based organic solvent to prepare an electrolyte solution having high ionic conductivity.

Specific examples of the linear ester-based organic solvent may be at least one organic solvent selected from the group consisting of methyl acetate, ethyl acetate, propyl acetate, methyl propionate, ethyl propionate, propyl propionate, and butyl propionate.

Also, the cyclic ester-based organic solvent may include at least one organic solvent selected from the group consisting of γ-butyrolactone, γ-valerolactone, γ-caprolactone, σ-valerolactone, and ε-caprolactone.

The organic solvent may be used by adding an organic solvent typically used in an electrolyte solution for a lithium secondary battery without limitation, if necessary. For example, the organic solvent may further include at least one organic solvent selected from an ether-based organic solvent, an amide-based organic solvent, and a nitrile-based organic solvent.

(3) Additive

The non-aqueous electrolyte for a lithium secondary battery of the present invention may include a compound represented by the following Formula 1 as an additive.

[Formula 1]

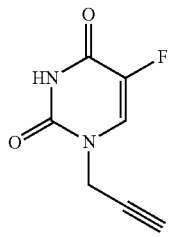

Since the compound represented by Formula 1 includes a nitrogen (N) atom as an electron donor capable of acting as a Lewis base, it may scavenge a Lewis acid, such as $PF_5$, which is generated as a lithium salt decomposition product, and thus, it may prevent additional decomposition of the organic solvent caused by the Lewis acid.

Also, the compound represented by Formula 1 includes a F atom, wherein since the F atom is separated from the compound of Formula 1 to be converted into LiF or the like as a component of forming a negative electrode SEI, it allows a film to be stably formed on a surface of a negative electrode.

Furthermore, the compound represented by Formula 1 includes a propargyl functional group, wherein the propargyl functional group may allow a film to be densely formed by inducing polymerization of the negative electrode film.

The compound represented by Formula 1 may obtain a better effect when the compound represented by Formula 1 is particularly used with a negative electrode including a silicon (Si)-based negative electrode active material. The negative electrode including the silicon-based negative electrode active material contains more O-rich components in the SEI than a negative electrode only using a carbon-based negative electrode active material. Since the O-rich film components tend to be more easily decomposed by a Lewis acid in the electrolyte, instability of the negative electrode SEI at high temperatures is increased when the silicon-based negative electrode active material is used, and, as a result, high-temperature durability may be reduced. However, in a case in which the compound represented by Formula 1 is used as an electrolyte additive, since the Lewis acid may be effectively scavenged as described above and the negative electrode film may be densely formed, stability of the negative electrode film at high temperatures may be improved, and, as a result, the degradation of the battery performance due to the decomposition of the negative electrode film may be effectively prevented.

The compound represented by Formula 1 may be included in an amount of 0.1 part by weight to 3 parts by weight, and preferably, 0.5 part by weight to 2 parts by weight based on 100 parts by weight of the non-aqueous electrolyte. The reason for this is that, if the amount of the compound represented by Formula 1 is excessively small, an effect is insignificant, and, if the amount of the compound represented by Formula 1 is excessively large, a side effect, such as an increase in resistance, may occur.

(4) Additional Additives

In order to prevent a non-aqueous electrolyte solution from being decomposed to cause collapse of a negative electrode in a high output environment, or further improve low-temperature high-rate discharge characteristics, high-temperature stability, overcharge protection, and a battery swelling suppression effect at high temperatures, the non-aqueous electrolyte according to the present invention may further include other additional additives in addition to the compound represented by Formula 1, if necessary.

Examples of the additional additive may be at least one selected from the group consisting of a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, and a lithium salt-based compound.

The cyclic carbonate-based compound, for example, may include vinylene carbonate (VC) or vinyl ethylene carbonate.

The halogen-substituted carbonate-based compound, for example, may include fluoroethylene carbonate (FEC).

The sultone-based compound, for example, may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

The sulfate-based compound, for example, may include ethylene sulfate (Esa), trimethylene sulfate (TMS), or methyl trimethylene sulfate (MTMS).

The phosphate-based compound, for example, may include at least one compound selected from the group consisting of lithium difluoro bis(oxalato)phosphate, lithium difluorophosphate, tetramethyl trimethylsilyl phosphate, trimethylsilyl phosphite, tris(2,2,2-trifluoroethyl)phosphate, and tris(trifluoroethyl)phosphite.

The borate-based compound, for example, may include tetraphenylborate and lithium oxalyldifluoroborate.

The nitrile-based compound, for example, may include at least one compound selected from the group consisting of succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The benzene-based compound, for example, may include fluorobenzene, the amine-based compound may include triethanolamine or ethylenediamine, and the silane-based compound may include tetravinylsilane.

The lithium salt-based compound is a compound different from the lithium salt included in the non-aqueous electrolyte solution, wherein the lithium salt-based compound may include at least one compound selected from the group consisting of $LiPO_2F_2$, LiODFB, LiBOB (lithium bis(oxalato)borate ($LiB(C_2O_4)_2$)), and $LiBF_4$.

In a case in which vinylene carbonate, vinyl ethylene carbonate, or succinonitrile, among these additional additives, is included, a more robust SEI may be formed on a surface of the negative electrode during an initial activation process of the secondary battery.

In a case in which $LiBF_4$ is included, high-temperature stability of the secondary battery may be improved by suppressing the generation of gas which may be generated due to the decomposition of the electrolyte solution during high-temperature storage.

The additional additives may be used as a mixture of two or more thereof, and may be included in an amount of 0.01 wt % to 50 wt %, particularly 0.01 wt % to 10 wt %, and preferably 0.05 wt % to 5 wt % based on a total weight of the non-aqueous electrolyte. If the amount of the additional additive is less than 0.01 wt %, effects of improving low-temperature output, high-temperature storage characteristics, and high-temperature life characteristics of the battery are insignificant, and, if the amount of the additional additive is greater than 50 wt %, there is a possibility that the side reaction occurs excessively during charge and discharge of the battery due to the excessive amount of the additive. Particularly, since the additives for forming an SEI may not be sufficiently decomposed at high temperatures when excessive amounts of the additives for forming an SEI are added, an unreacted material may be formed in the electrolyte solution at room temperature, or the additives for forming an SEI may be present in the form of precipitates. Accordingly, a side reaction may occur in which life or resistance characteristics of the secondary battery are degraded.

Lithium Secondary Battery

Next, a lithium secondary battery according to the present invention will be described.

The lithium secondary battery according to the present invention includes a positive electrode, a negative electrode, a separator disposed between the positive electrode and the negative electrode, and a non-aqueous electrolyte, and, in this case, the non-aqueous electrolyte is the non-aqueous electrolyte according to the present invention. Since the non-aqueous electrolyte has been described above, a description thereof will be omitted and other components will be described below.

(1) Positive Electrode

The positive electrode according to the present invention may include a positive electrode active material layer including a positive electrode active material, and, if necessary, the positive electrode active material layer may further include a conductive agent and/or a binder.

The positive electrode active material is a compound capable of reversibly intercalating and deintercalating lithium, wherein the positive electrode active material may specifically include a lithium composite metal oxide including lithium and at least one transition metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-a}Mn_aO_2$ (where $0<a<1$), $LiMn_{2-b}Ni_bO_4$ (where $0<b<2$)), lithium-nickel-cobalt-based oxide (e.g., $LiNi_{1-a1}Co_{a1}O_2$ (where $0<a1<1$)), lithium-manganese-cobalt-based oxide (e.g., $LiCo_{1-a2}Mn_{a2}O_2$ (where $0<a2<1$), $LiMn_{2-b1}Co_{b1}O_4$ (where $0<b1<2$)), lithium-nickel-manganese-cobalt-based oxide (e.g., $Li(Ni_{p1}Co_{q1}Mn_{r1})O_2$ (where $0<p1<1$, $0<q1<1$, $0<r1<1$, and $p1+q1+r1=1$) or $Li(Ni_{p2}Co_{q2}Mn_{r2})O_4$ (where $0<p2<2$, $0<q2<2$, $0<r2<2$, and $p2+q2+r2=2$), or lithium-nickel-cobalt-transition metal (M) oxide (e.g., $Li(Ni_{p3}Co_{q3}Mn_{r3}M_{s3})O_2$ (where M is selected from the group consisting of aluminum (Al), iron (Fe), vanadium (V), chromium (Cr), titanium (Ti), tantalum (Ta), magnesium (Mg), and molybdenum (Mo), and p3, q3, r3, and s3 are atomic fractions of each independent elements, wherein $0<p3<1$, $0<q3<1$, $0<r3<1$, $0<S3<1$, and $p3+q3+r3+S3=1$), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$, etc.), or lithium nickel cobalt aluminum oxide (e.g., $LiNi_{0.8}Co_{0.15}Al_{0.05}O_2$, etc.), and, more specifically, the lithium composite metal oxide may be a lithium nickel cobalt manganese-based oxide represented by Formula 2 below.

  [Formula 2]

$$Li_x[Ni_yCo_zMN_wM^1{}_v]O_{2-p}A_p$$

In [Formula 2], $M^1$ is a doping element substituted for transition metal sites and may include at least one element selected from the group consisting of tungsten (W), copper (Cu), iron (Fe), vanadium (V), chromium (Cr), titanium (Ti), zirconium (Zr), zinc (Zn), aluminum (Al), indium (In), tantalum (Ta), yttrium (Y), lanthanum (La), strontium (Sr), gallium (Ga), scandium (Sc), gadolinium (Gd), samarium (Sm), calcium (Ca), cerium (Ce), niobium (Nb), magnesium (Mg), boron (B), and molybdenum (Mo).

A is an element substituted for oxygen sites and may include at least one element selected from the group consisting of fluorine (F), chlorine (Cl), bromine (Br), iodine (I), astatine (At), and sulfur (S).

x represents an atomic ratio of lithium to total transition metals in the lithium nickel cobalt manganese-based oxide, wherein x may be in a range of 1 to 1.30, preferably greater than 1 to 1.30 or less, and more preferably 1.005 to 1.30, even more preferably, 1.01 to 1.20.

y represents an atomic ratio of nickel among the transition metals in the lithium nickel cobalt manganese-based oxide, wherein y is in a range of 0.3 or more to less than 1, preferably 0.6 to less than 1, and more preferably 0.6 to 0.95. Since higher capacity may be achieved as an amount of the nickel among the transition metals is increased, that the atomic ratio of the nickel is 0.6 or more is more advantageous for achieving high capacity.

z represents an atomic ratio of cobalt among the transition metals in the lithium nickel cobalt manganese-based oxide, wherein z is in a range of greater than 0 to 0.6 or less, preferably, 0.01 to 0.4.

w represents an atomic ratio of manganese among the transition metals in the lithium nickel cobalt manganese-based oxide, wherein w is in a range of greater than 0 to 0.6 or less, preferably, 0.01 to 0.4.

v represents an atomic ratio of the doping element $M^1$ doped into the transition metal sites in the lithium nickel cobalt manganese-based oxide, wherein v may be in a range of 0 to 0.2, preferably, 0 to 0.1. In a case in which the doping element $M^1$ is added, there is an effect of improving structural stability of the lithium nickel cobalt manganese-based oxide, but, since capacity may be reduced when the amount of the doping element is increased, it is desirable that the doping element is included at an atomic ratio of 0.2 or less.

p represents an atomic ratio of the element A substituted for the oxygen sites, wherein p may be in a range of 0 to 0.2, preferably, 0 to 0.1.

In Formula 2, $y+z+w+v=1$.

Specific examples of the lithium nickel cobalt manganese-based oxide may be $LiNi_{1/3}Co_{1/3}Mn_{1/3}O_2$, $LiNi_{0.5}Co_{0.2}Mn_{0.3}O_2$, $LiNi_{0.5}Co_{0.3}Mn_{0.2}O_2$, $LiNi_{0.6}Co_{0.2}Mn_{0.2}O_2$, and $LiNi_{0.8}Co_{0.1}Mn_{0.1}O_2$, but the lithium nickel cobalt manganese-based oxide is not limited thereto.

The positive electrode active material may be included in an amount of 80 wt % to 98 wt %, more specifically, 85 wt % to 98 wt % based on a total weight of the positive electrode active material layer. When the positive electrode active material is included in an amount within the above range, excellent capacity characteristics may be exhibited.

Next, the conductive agent is used to provide conductivity to the electrode, wherein any conductive agent may be used without particular limitation as long as it has suitable electron conductivity without causing adverse chemical changes in the battery.

Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used.

The conductive agent may be included in an amount of 0.1 wt % to 10 wt %, preferably, 0.1 wt % to 5 wt % based on the total weight of the positive electrode active material layer.

Next, the binder improves the adhesion between the positive electrode active material particles and the adhesion between the positive electrode active material and a current collector.

Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 wt % to 15 wt %, preferably, 0.1 wt % to 10 wt % based on the total weight of the positive electrode active material layer.

The positive electrode of the present invention as described above may be prepared by a method of preparing a positive electrode which is known in the art. For example, the positive electrode may be prepared by a method in which a positive electrode collector is coated with a positive electrode slurry, which is prepared by dissolving or dispersing the positive electrode active material, the binder, and/or the conductive agent in a solvent, dried, and then rolled, or a method in which the positive electrode slurry is cast on a separate support, and a film separated from the support is then laminated on the positive electrode collector.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode material. The positive electrode collector, for example, may be used in various shapes such as that of a film, a sheet, a foil, a net, a porous body, a foam body, a non-woven fabric body, and the like.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the positive electrode material mixture may be adjusted to have an appropriate viscosity in consideration of a coating thickness of the positive electrode material mixture, manufacturing yield, and workability, and is not particularly limited.

(2) Negative Electrode

Next, a negative electrode will be described.

The negative electrode according to the present invention includes a carbon-based negative electrode active material as a negative electrode active material. Specifically, the negative electrode includes a negative electrode active material layer including the carbon-based negative electrode active material, and the negative electrode active material layer may further include a conductive agent and/or a binder, if necessary.

As the carbon-based negative electrode active material, various carbon-based negative electrode active materials used in the art, for example, graphite-based materials such as natural graphite, artificial graphite, and Kish graphite; pyrolytic carbon, mesophase pitch based carbon fiber, mesocarbon microbeads, mesophase pitches, high-temperature sintered carbon such as petroleum or coal tar pitch derived cokes, soft carbon, and hard carbon may be used. A shape of the carbon-based negative electrode active material is not particularly limited, and materials of various shapes, such as an irregular shape, planar shape, flaky shape, spherical shape, or fibrous shape, may be used.

Preferably, the carbon-based negative electrode active material may include at least one of natural graphite or artificial graphite. More preferably, the carbon-based negative electrode active material may include natural graphite and artificial graphite. In a case in which the natural graphite and the artificial graphite are used together, adhesion with a current collector may be increased to suppress exfoliation of the active material.

The negative electrode according to the present invention may further include another type of negative electrode active material, such as a silicon-based negative electrode active material, as the negative electrode active material in addition to the carbon-based negative electrode active material.

The silicon-based negative electrode active material may include at least one selected from the group consisting of metallic silicon (Si), silicon oxide ($SiO_x$, where $0<x<2$), silicon carbide (SiC), and a Si—Y alloy (where Y is an element selected from the group consisting of alkali metal, alkaline earth metal, a Group 13 element, a Group 14 element, transition metal, a rare earth element, and a combination thereof, and is not Si). The element Y may be selected from the group consisting of Mg, Ca, Sr, barium (Ba), radium (Ra), Sc, Y, Ti, Zr, hafnium (Hf), rutherfordium (Rf), V, Nb, Ta, dubidium (Db), Cr, Mo, W, seaborgium (Sg), technetium (Tc), rhenium (Re), bohrium (Bh), Fe, lead (Pb), ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, Ga, tin (Sn), In, germanium (Ge), phosphorus (P), arsenic (As), antimony (Sb), bismuth (Bi), S, selenium (Se), tellurium (Te), polonium (Po), and a combination thereof.

Since the silicon-based negative electrode active material has higher capacity characteristics than the carbon-based negative electrode active material, better capacity characteristics may be obtained when the silicon-based negative electrode active material is further included. However, a silicon-containing negative electrode contains more O-rich components in the SEI than a graphite negative electrode, and the SEI containing the O-rich components tends to be more easily decomposed when a Lewis acid, such as HF or $PF_5$, is present in the electrolyte. Thus, with respect to the silicon-containing negative electrode, there is a need to suppress the formation of the Lewis acid, such as HF or $PF_5$, in the electrolyte or remove (or scavenge) the formed Lewis acid in order to stably maintain the SEI. Since the non-aqueous electrolyte according to the present invention uses the additive containing a N atom acting as a Lewis base, a propargyl group improving stability of the SEI on the surface of the negative electrode, and a F atom, it may effectively suppress the decomposition of the SEI when the silicon-containing negative electrode is used.

According to an embodiment, the negative electrode active material may be a mixture of the silicon-based negative electrode active material and the carbon-based negative electrode active material, and, in this case, a mixing ratio of the silicon-based negative electrode active material: the carbon-based negative electrode active material may be in a range of 1:99 to 50:50, preferably, 5:95 to 30:70, as a weight ratio. In a case in which the mixing ratio of the silicon-based negative electrode active material to the carbon-based negative electrode active material satisfies the above range, since a volume expansion of the silicon-based negative electrode active material is suppressed while capacity characteristics are improved, excellent cycle performance may be secured.

The negative electrode active material may be included in an amount of 80 wt % to 99 wt % based on a total weight of the negative electrode active material layer. In a case in which the amount of the negative electrode active material satisfies the above range, excellent capacity characteristics and electrochemical properties may be obtained.

Next, the conductive agent is a component for further improving conductivity of the negative electrode active material, wherein the conductive agent may be added in an amount of 10 wt % or less, preferably, 5 wt % or less based on the total weight of the negative electrode active material layer. Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The binder is a component that assists in the binding between the conductive agent, the active material, and the current collector, wherein the binder is commonly added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a nitrile-butadiene rubber, a fluoro rubber, and various copolymers thereof.

The negative electrode may be prepared by a method of preparing a negative electrode which is known in the art. For example, the negative electrode may be prepared by a method in which a negative electrode collector is coated with a negative electrode slurry, which is prepared by dissolving or dispersing the negative electrode active material as well as selectively the binder and the conductive agent in a solvent, rolled and dried, or may be prepared by casting the negative electrode slurry on a separate support and then laminating a film separated from the support on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. The negative electrode collector may typically have a thickness of 3 µm to 500 µm, and, similar to the positive electrode collector, microscopic irregularities may be formed on the surface of the collector to improve the adhesion of the negative electrode active material. The negative electrode collector, for example, may be used in various shapes such as that of a film, a sheet, a foil, a net, a porous body, a foam body, a non-woven fabric body, and the like.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the negative electrode slurry may be adjusted to have an appropriate viscosity in consideration of a coating thickness of the negative electrode material mixture, manufacturing yield, and workability, and is not particularly limited.

(3) Separator

The lithium secondary battery according to the present invention includes a separator between the positive electrode and the negative electrode.

The separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used.

Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used as a separator. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

The lithium secondary battery according to the present invention as described above has excellent high-temperature cycle characteristics and resistance characteristics.

Specifically, charging at 0.33 C to 4.2 V under a constant current/constant voltage (CC/CV) condition at 45° C. and discharging at a CC of 0.33 C to 3 V are set as one cycle, and, after 200 cycles of the charging and the discharging are performed on the lithium secondary battery according to the present invention, a capacity retention measured according to the following Equation (1) is 75% or more, preferably 80% or more, and more preferably 85% or more, wherein high-temperature cycle characteristics are excellent.

$$\text{Capacity retention(\%)}=(\text{discharge capacity after 200 cycles/discharge capacity after one cycle})\times 100 \quad \text{Equation (1):}$$

Also, charging at 0.33 C to 4.2 V under a constant current/constant voltage (CC/CV) condition at 45° C. and discharging at a CC of 0.33 C to 3 V are set as one cycle, and, after 200 cycles of the charging and the discharging are performed on the lithium secondary battery according to the present invention, a resistance increase rate measured according to the following Equation (2) is 20% or less, preferably, 15% or less, wherein a resistance increase suppression effect during a high-temperature cycle operation is excellent.

$$\text{Resistance increase rate(\%)}=\{(\text{resistance after 200 cycles}-\text{resistance after one cycle})/\text{resistance after one cycle}\}\times 100 \quad \text{Equation (2):}$$

The lithium secondary battery according to the present invention as described above may be suitably used in portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples.

EXAMPLES

Example 1

(Non-Aqueous Electrolyte Preparation)

After $LiPF_6$ was dissolved in 99.9 g of a non-aqueous organic solvent, in which ethylene carbonate (EC) and ethyl methyl carbonate (EMC) were mixed in a volume ratio of 30:70, such that a concentration of the $LiPF_6$ was 1.0 M, a non-aqueous electrolyte was prepared by adding 0.1 g of the compound represented by Formula 1 as an additive.

(Positive Electrode Preparation)

A lithium nickel-manganese-cobalt-based oxide ($LiNi_{0.8}Co_{0.1}Mn_{0.1}O_2$; NCM811) as positive electrode active material particles, carbon black as a conductive agent, and polyvinylidene fluoride (PVDF), as a binder, were added to N-methyl-2-pyrrolidone (NMP), as a solvent, at a weight ratio of 90:5:5 to prepare a positive electrode active material slurry (solid content 48 wt %). A 100 μm thick positive electrode collector (Al thin film) was coated with the positive electrode active material slurry, dried, and roll-pressed to prepare a positive electrode.

(Negative Electrode Preparation)

A negative electrode active material (artificial graphite: SiO=95:5 weight ratio), PVDF as a binder, and carbon black, as a conductive agent, were added to NMP, as a solvent, at a weight ratio of 95:2:3 to prepare a negative electrode active material slurry (solid content: 70 wt %). A 90 μm thick negative electrode collector (Cu thin film) was coated with the negative electrode active material slurry, dried, and roll-pressed to prepare a negative electrode.

(Secondary Battery Preparation)

After an electrode assembly was prepared by a conventional method of sequentially stacking a polyethylene porous film with the positive electrode and negative electrode prepared by the above-described methods, the electrode assembly was put in a pouch-type secondary battery case, and the above-prepared non-aqueous electrolyte was injected thereinto to prepare a lithium secondary battery.

Example 2

A lithium secondary battery was prepared in the same manner as in Example 1 except that, after $LiPF_6$ was dissolved in 99.5 g of a non-aqueous organic solvent, in which ethylene carbonate (EC) and ethyl methyl carbonate (EMC) were mixed in a volume ratio of 30:70, such that a concentration of the $LiPF_6$ was 1.0 M, a non-aqueous electrolyte was prepared by adding 0.5 g of the compound represented by Formula 1 as an additive.

Example 3

A lithium secondary battery was prepared in the same manner as in Example 1 except that, after $LiPF_6$ was dissolved in 99 g of a non-aqueous organic solvent, in which ethylene carbonate (EC) and ethyl methyl carbonate (EMC) were mixed in a volume ratio of 30:70, such that a concentration of the $LiPF_6$ was 1.0 M, a non-aqueous electrolyte was prepared by adding 1 g of the compound represented by Formula 1 as an additive.

Example 4

A lithium secondary battery was prepared in the same manner as in Example 1 except that, after $LiPF_6$ was dissolved in 98 g of a non-aqueous organic solvent, in which ethylene carbonate (EC) and ethyl methyl carbonate (EMC) were mixed in a volume ratio of 30:70, such that a concentration of the $LiPF_6$ was 1.0 M, a non-aqueous electrolyte was prepared by adding 2 g of the compound represented by Formula 1 as an additive.

Example 5

(Non-Aqueous Electrolyte Preparation)

After $LiPF_6$ was dissolved in 99.5 g of a non-aqueous organic solvent, in which ethylene carbonate (EC) and ethyl methyl carbonate (EMC) were mixed in a volume ratio of 30:70, such that a concentration of the $LiPF_6$ was 1.0 M, a non-aqueous electrolyte was prepared by adding 0.5 g of the compound represented by Formula 1 as an additive.

(Positive Electrode Preparation)

A lithium nickel-manganese-cobalt-based oxide ($LiNi_{0.6}Co_{0.2}Mn_{0.2}O_2$; NCM622) as positive electrode active material particles, carbon black as a conductive agent, and polyvinylidene fluoride (PVDF), as a binder, were added to N-methyl-2-pyrrolidone (NMP), as a solvent, at a weight ratio of 90:5:5 to prepare a positive electrode active material slurry (solid content 48 wt %). A 100 μm thick positive electrode collector (Al thin film) was coated with the positive electrode active material slurry, dried, and roll-pressed to prepare a positive electrode.

(Negative Electrode Preparation)

A negative electrode active material (artificial graphite: SiO=97:3 weight ratio), PVDF as a binder, and carbon black, as a conductive agent, were added to NMP, as a solvent, at a weight ratio of 95:2:3 to prepare a negative electrode active material slurry (solid content: 70 wt %). A 90 μm thick negative electrode collector (Cu thin film) was coated with the negative electrode active material slurry, dried, and roll-pressed to prepare a negative electrode.

(Secondary Battery Preparation)

After an electrode assembly was prepared by a conventional method of sequentially stacking a polyethylene porous film with the positive electrode and negative electrode prepared by the above-described methods, the electrode assembly was put in a pouch-type secondary battery case, and the above-prepared non-aqueous electrolyte was injected thereinto to prepare a lithium secondary battery.

Comparative Example 1

A lithium secondary battery was prepared in the same manner as in Example 1 except that a non-aqueous electrolyte was prepared by dissolving $LiPF_6$ in 100 g of a non-aqueous organic solvent, in which ethylene carbonate (EC) and ethyl methyl carbonate (EMC) were mixed in a volume ratio of 30:70, such that a concentration of the $LiPF_6$ was 1.0 M, and not adding an additive.

Comparative Example 2

A lithium secondary battery was prepared in the same manner as in Example 1 except that, after $LiPF_6$ was dissolved in 99.5 g of a non-aqueous organic solvent, in which ethylene carbonate (EC) and ethyl methyl carbonate (EMC) were mixed in a volume ratio of 30:70, such that a concentration of the $LiPF_6$ was 1.0 M, a non-aqueous electrolyte was prepared by adding 0.5 g of a compound represented by the following Formula A as an additive.

[Formula A]

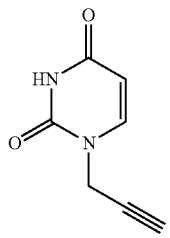

Comparative Example 3

A lithium secondary battery was prepared in the same manner as in Example 1 except that, after $LiPF_6$ was dissolved in 99 g of a non-aqueous organic solvent, in which ethylene carbonate (EC) and ethyl methyl carbonate (EMC) were mixed in a volume ratio of 30:70, such that a concentration of the $LiPF_6$ was 1.0 M, a non-aqueous electrolyte was prepared by adding 1 g of the compound represented by Formula A as an additive.

Comparative Example 4

A lithium secondary battery was prepared in the same manner as in Example 5 except that, after $LiPF_6$ was dissolved in 99.5 g of a non-aqueous organic solvent, in which ethylene carbonate (EC) and ethyl methyl carbonate (EMC) were mixed in a volume ratio of 30:70, such that a concentration of the $LiPF_6$ was 1.0 M, a non-aqueous electrolyte was prepared by adding 0.5 g of the compound represented by Formula A as an additive.

TABLE 1

| | Organic solvent (g) | Additive Type | Addition amount (g) | Positive electrode active material | Negative electrode active material |
|---|---|---|---|---|---|
| Example 1 | 99.9 | Formula 1 | 0.1 | NCM811 | Artificial graphite: SiO = 95:5 |
| Example 2 | 99.5 | Formula 1 | 0.5 | NCM811 | Artificial graphite: SiO = 95:5 |
| Example 3 | 99 | Formula 1 | 1 | NCM811 | Artificial graphite: SiO = 95:5 |
| Example 4 | 98 | Formula 1 | 2 | NCM811 | Artificial graphite: SiO = 95:5 |
| Example 5 | 99.5 | Formula 1 | 0.5 | NCM622 | Artificial graphite: SiO = 97:3 |
| Comparative Example 1 | 100 | — | 0 | NCM811 | Artificial graphite: SiO = 95:5 |
| Comparative Example 2 | 99.5 | Formula A | 0.5 | NCM811 | Artificial graphite: SiO = 95:5 |
| Comparative Example 3 | 99 | Formula A | 1 | NCM811 | Artificial graphite: SiO = 95:5 |
| Comparative Example 4 | 99.5 | Formula A | 0.5 | NCM622 | Artificial graphite: SiO = 97:3 |

Experimental Example 1: HF Scavenging Performance Evaluation

After the non-aqueous electrolytes prepared by Examples 1 to 3 and Comparative Example 1 were stored at 45° C. for 2 weeks, HF contents were measured by titration. Measurement results are listed in [Table 2] below.

TABLE 2

| | HF content (ppm) |
|---|---|
| Example 1 | 101 |
| Example 2 | 53 |
| Example 3 | 41 |
| Comparative Example 1 | 128 |

As illustrated in [Table 2], with respect to the non-aqueous electrolytes of Examples 1 to 3 including the additive of Formula 1, HF contents were reduced in comparison to that of the non-aqueous electrolyte of Comparative Example 1 without an additive, and, accordingly, a damage of the SEI caused by HF may be minimized.

Experimental Example 2: High-Temperature Cycle Characteristics Evaluation (1)

That each of the lithium secondary batteries prepared by Examples 1 to 3 and Comparative Example 1 was charged at 0.33 C to 4.2 V under a constant current/constant voltage (CC/CV) condition at 45° C. and was then discharged at a CC of 0.33 C to 3 V was set as one cycle, and 200 cycles of the charging and discharging were performed to measure capacity retention and resistance increase rate. In this case, the capacity retention was calculated according to the following Equation (1), and the resistance increase rate was calculated according to the following Equation (2). Measurement results are listed in [Table 3] below.

Capacity retention (%)=(discharge capacity after 200 cycles/discharge capacity after one cycle)×100   Equation (1):

Resistance increase rate (%)={(resistance after 200 cycles−resistance after one cycle)/resistance after one cycle}×100   Equation (2):

TABLE 3

|  | Capacity retention (%) | Resistance increase rate (%) |
| --- | --- | --- |
| Example 1 | 78.5 | 18.5 |
| Example 2 | 85.2 | 13.4 |
| Example 3 | 88.7 | 10.2 |
| Comparative Example 1 | 72.5 | 21.2 |

Referring to [Table 3], with respect to Examples 1 to 3 including the additive according to the present invention, it may be confirmed that capacity retentions after 200 cycles were increased and resistance increase rates were reduced in comparison to that of Comparative Example 1 without an additive.

Experimental Example 3: High-Temperature Cycle Characteristics Evaluation (2)

That each of the lithium secondary batteries prepared by Example 5 and Comparative Examples 1 and 4 was charged at 0.33 C to 4.2 V under a constant current/constant voltage (CC/CV) condition at 45° C. and was then discharged at a CC of 0.33 C to 3 V was set as one cycle, and 200 cycles of the charging and discharging were performed to measure capacity retention and resistance increase rate. Measurement results are illustrated in the FIGURE.

As illustrated in the FIGURE, the lithium secondary battery of Example 5 exhibited better capacity retention and resistance characteristics during high-temperature charge and discharge than the lithium secondary batteries of Comparative Examples 1 and 4. Particularly, with respect to the lithium secondary battery of Example 5, it may be confirmed that the resistance increase rate after high-temperature charge and discharge was significantly lower than those of the lithium secondary batteries of Comparative Examples 1 and 4.

Experimental Example 4: Gas Generation Amount Evaluation

Each of the lithium secondary batteries prepared by Examples 2 to 4 and Comparative Example 1 was fully charged to a state of charge (SOC) of 100% at 0.33 C to 4.2 V (0.05 C cut off) under a CC/CV condition at 25° C. Then, a gas generation amount was measured while the fully charged lithium secondary battery was stored at 60° C. for 4 weeks. Measurement results are presented in [Table 4] below.

TABLE 4

|  | Gas generation amount (μl) |
| --- | --- |
| Example 2 | 1132 |
| Example 3 | 767 |
| Example 4 | 391 |
| Comparative Example 1 | 2510 |

As illustrated in [Table 4], with respect to Examples 2 to 4 including the additive of Formula 1, it may be confirmed that gas generation amounts were significantly reduced in comparison to that of Comparative Example 1 without an additive.

Experimental Example 5: High-Temperature Storage Characteristics Evaluation

Each of the lithium secondary batteries prepared by Examples 2 and 3 and Comparative Examples 1 to 3 was fully charged to an SOC of 100% at 0.33 C to 4.2 V (0.05 C cut off) under a CC/CV condition at 25° C. Then, the fully charged lithium secondary battery was stored at 60° C. for 60 days. Open-circuit voltages (OCVs) before and after the high-temperature storage were measured with an OCV measuring device by HIOKI (model BT3554) to calculate a drop in the OCV after the high-temperature storage. Measurement results are presented in [Table 5] below.

TABLE 5

|  | OCV drop (mV) |
| --- | --- |
| Example 2 | 153 |
| Example 3 | 24 |
| Comparative Example 1 | 785 |
| Comparative Example 2 | 268 |
| Comparative Example 3 | 214 |

As illustrated in [Table 5], the lithium secondary batteries of Examples 2 and 3 each had a smaller voltage drop than the lithium secondary batteries of Comparative Examples 1 to 3 even after long-term storage at high temperature in a fully charged state. In the compound of Formula 1 used in the examples of the present invention, since N, F and O with high electronegativity were evenly distributed in a ring structure to be able to increase Lewis basicity and a fluorine atom, as a good leaving group, was separated and converted into LiF in the form of a stable negative electrode film to form a negative electrode film without an additional decomposition reaction, performance degradation may be minimized even after the high-temperature storage.

In contrast, since the compound of Formula A used in Comparative Examples 2 and 3 included a propargyl group, it had an effect of suppressing the voltage drop to some extent, but the voltage drop suppression effect was smaller than that of the compound of Formula 1 including F.

The invention claimed is:
1. A non-aqueous electrolyte for a lithium secondary battery, the non-aqueous electrolyte comprising
an organic solvent;
a lithium salt; and
a compound represented by Formula 1:

[Formula 1]

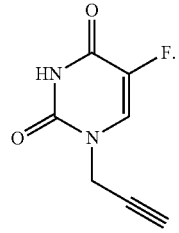

2. The non-aqueous electrolyte for a lithium secondary battery of claim 1, wherein the compound represented by Formula 1 is present in an amount of 0.1 part by weight to 3 parts by weight based on 100 parts by weight of the non-aqueous electrolyte.

3. The non-aqueous electrolyte for a lithium secondary battery of claim 1, wherein the compound represented by Formula 1 is present in an amount of 0.5 part by weight to 2 parts by weight based on 100 parts by weight of the non-aqueous electrolyte.

4. A lithium secondary battery, comprising:
a positive electrode;
a negative electrode;
a separator disposed between the positive electrode and the negative electrode; and
the non-aqueous electrolyte of claim 1.

5. The lithium secondary battery of claim 4, wherein the positive electrode comprises a positive electrode active material represented by Formula 2:

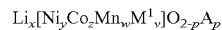  [Formula 2]

wherein, in Formula 2,
$M^1$ comprises at least one of tungsten (W), copper (Cu), iron (Fe), vanadium (V), chromium (Cr), titanium (Ti), zirconium (Zr), zinc (Zn), aluminum (Al), indium (In), tantalum (Ta), yttrium (Y), lanthanum (La), strontium (Sr), gallium (Ga), scandium (Sc), gadolinium (Gd), samarium (Sm), calcium (Ca), cerium (Ce), niobium (Nb), magnesium (Mg), boron (B), or molybdenum (Mo), A comprises at least one of fluorine (F), chlorine (Cl), bromine (Br), iodine (I), astatine (At), or sulfur(S), and $1.0 \leq x \leq 1.30$, $0.3 \leq y < 1$, $0 < z \leq 0.6$, $0 < w \leq 0.6$, $0 \leq v \leq 0.2$, and $0 \leq p < 0.2$.

6. The lithium secondary battery of claim 5, wherein, in Formula 2, $0.6 \leq y < 1$, $0.01 \leq z \leq 0.4$, and $0.01 \leq w \leq 0.4$.

7. The lithium secondary battery of claim 4, wherein the negative electrode comprises a carbon-based negative electrode active material.

8. The lithium secondary battery of claim 4, wherein the negative electrode comprises a carbon-based negative electrode active material and a silicon-based negative electrode active material.

9. The lithium secondary battery of claim 8, wherein the negative electrode comprises the carbon-based negative electrode active material and the silicon-based negative electrode active material in a weight ratio of 99:1 to 50:50.

* * * * *